Patented Jan. 19, 1932

1,841,636

UNITED STATES PATENT OFFICE

KENNETH HERBERT SAUNDERS AND MORDECAI MENDOZA, OF MANCHESTER, ENGLAND, ASSIGNORS TO BRITISH DYESTUFFS CORPORATION LIMITED, OF MANCHESTER, ENGLAND

AMINO AND NITRO DERIVATIVES OF ORTHO-HYDROXY-CARBOXY-DIPHENYL SULPHIDES, AND PROCESS OF PREPARING SAME

No Drawing. Application filed March 26, 1926, Serial No. 97,758, and in Great Britain July 31, 1925.

This invention relates to processes of making dyestuffs and intermediates and products thereof; and it comprises methods of making nitro derivatives of ortho-hydroxy-carboxy diphenyl sulphides having the nitro group or groups attached to one phenyl residue and the hydroxyl and carboxyl attached to the other phenyl residue wherein ortho-hydroxy-carboxy-phenyl-5-thiols are condensed with nitro compounds of the aromatic series containing a labile nuclear halogen atom and then such nitro compounds are reduced to form the corresponding amino compounds, such amino compounds being intermediates from which dyestuffs may be produced; and it also comprises the nitro and amino compounds produced by the above processes; all as more fully hereinafter set forth and as claimed.

Our new intermediates are amino diphenyl sulphides which may be represented by the general formula

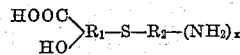

wherein $R_1$ and $R_2$ represent phenyl residues which may be further substituted, $x$ is 1 or 2 and in which the COOH and the OH groups are ortho to each other. By the term phenyl residues we mean benzene residues which may or may not be further substituted. These intermediates are mixed diphenyl sulphides characterized by having an amino group in one portion of the molecule and a mordant fixing group or chelate group, in this instance the OH and COOH groups, in another portion of the molecule, the two portions being separated and united by a sulphur bridge. The new intermediates are useful in making azo dyestuffs not changing in shade in mordant dyeing. The intermediates are converted into dyestuffs by so treating the same as to convert the group $R_2$, which contains the amino group, into a chromophore group. In these new dyestuffs the chromophore group is separated from and united to the chelate group by a sulphur bridge. It is to such a structural arrangement that we mainly attribute the property of these azo dyestuffs of giving dyeings remaining practically or substantially unchanged in shade when the same are chromed.

In the Journal of the London Chemical Society of 1922, page 2560, Stewart has described 5-thiol-salicylic acid. We have found that this substance as well as its homologues and substitution products among the phenol-o-carboxylic acids are valuable as parent substances for the preparation of a number of useful derivatives, and they form a starting material in the present invention.

We have found that thiols of this type react and condense easily with nitro compounds of the aromatic series which contain a labile nuclear halogen atom. Condensation takes place more easily in those cases where the position ortho to the halogen atom is occupied by a nitro group. Either the thiol may be used in the form of its sodium salt, in which case the reaction proceeds with elimination of sodium halide, or condensation may be caried out, using it in the form of free acid in the presence of an acid binding agent, the condensation being carried out either in the presence of water or of some other appropriate solvent. There are thus obtained mono- or poly-nitro compounds of diphenyl sulphides. The following compounds are typical examples of the compounds which may be so obtained.

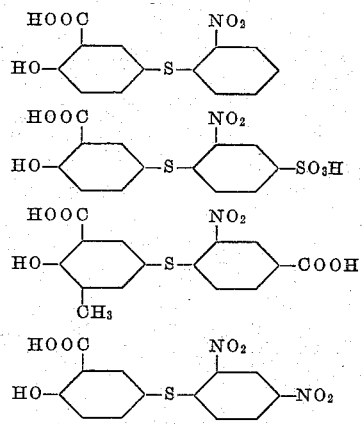

Such nitro sulphides may be reduced by the usual agents to the corresponding amino sulphides. These amino sulphides are typical of the intermediates which we use for the production of our new azo dyestuffs.

The amino sulphides of the general class indicated may be used in various ways. The monoamino sulphides may be used as first components, that is, they may be diazotized and coupled with the usual azo dye coupling components. The diamino sulphides may be used as second components, that is, they may be coupled with diazotized coupling components. Further the diamines may be partly acylated and the remaining amino group diazotized and coupled with a second component. Polyazo dyestuffs may be built up in a suitable manner.

The distinctive and valuable property of azo dyestuffs derived from our new amino sulphides is that the phenyl nucleus carrying the chelate group is separated from and connected to the phenyl nucleus to which the azo link is attached; separation being by a sulphur atom which acts as a chromophoric screen. Hence when these new dyestuffs are fixed on either animal or vegetable fibres by metallic mordants, little or no change in shade occurs, unless in addition there should be present an oxidizable structure or structures which give deeply colored metallic lakes. After fixation, the dyeings become fast to soap, milling, potting, etc.

Any amino, hydroxy or amino-hydroxy compound capable of coupling may be used as the second component in producing such new azo dyes; the choice being determined by any property (e. g. shade, solubility, etc.) which it is desirable to enhance in the dyestuff produced.

Mono- and polyazo dyestuffs may be produced. These azo dyestuffs are of many different types but they all have the distinguishing characteristic that the chelate group is separated from the chromophore group by a sulphur bridge They may be represented by the generic formula

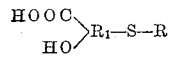

wherein $R_1$ represents a benzene residue and R represents a benzene residue having an azo group attached thereto, the grouping represented by R possessing chromophoric properties, and in which the OH and COOH groups are ortho to each other. Such azo dyes may be made by various processes. The processes of making monoazo dyes have been indicated ante. We find that the monoazo dyes derived from our new intermediates are especially advantageous. These monoazo dyes may be represented by the following general formula

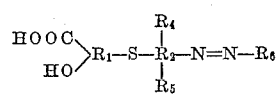

wherein $R_1$ represents a benzene residue in which the COOH and OH groups are ortho to each other, $R_2$ represents a benzene residue, $R_4$ represents hydrogen, a carboxyl group, a sulphonic group, an amino group, or acylated amino group, $R_5$ represents hydrogen or an amino group and $R_6$ represents the coupled residue of an azo dye component. By a "coupled residue of an azo dye component" we mean the coupled residue from an azo dye coupling component or from a diazotized coupling component. However, the production of polyazo dyes is also within the scope of the present invention. Polyazo dyes may be built up in any suitable manner, for instance, any of the following general processes may be used. (1) A diamino diphenyl sulphide may be coupled with tetrazotized benzidine or other suitable diamine. (2) A monoamino diphenyl sulphide may be coupled with a suitable amine or derivative thereof such as paraxylidine, cresidine, alpha-naphthylamine or methyl-omega sulphonate and the resulting dyestuff rediazotized and coupled again, thus building up straight chain azo dyestuffs in the well known manner. (3) A monoamino sulphide may be diazotized and coupled with a component capable of coupling a second time under different conditions with a second diazo compound or (4) a nitro-amine may be diazotized and coupled, for instance, to a diamino diphenyl sulphide, and after coupling one or more nitro-groups may be reduced, the monoazo dyestuff rediazotized and coupled a second time with another component. Monoazo and polyazo dyestuffs may be produced at will. Monoazo dyestuffs may be produced which are converted into dis- or polyazo dyestuffs. In our copending divisional application Ser. No. 323,198 filed Dec. 1, 1928 we set forth and claim the general class of dyestuffs indicated above.

Our present application is drawn to the mono and diamino sulphides, to the mono and dinitro sulphides and to the processes of producing them. A generic formula which can be used to represent these compounds is as follows:

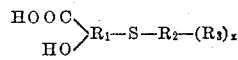

wherein $R_1$ and $R_2$ represent benzene residues which may be further substituted and in which the OH and COOH are ortho to each other, $R_3$ represents $NO_2$ or $NH_2$ and $x$ represents 1 or 2.

Other generic formulæ representing these compounds are as follows:

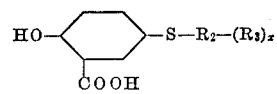

wherein $R_2$ represents a phenyl residue which may be further substituted, $R_3$ represents $NO_2$ or $NH_2$ and $x$ represents 1 or 2; and

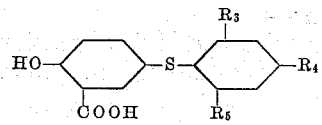

wherein $R_3$ represents $NO_2$ or $NH_2$, $R_4$ represents $NO_2$, $NH_2$, COOH, $SO_3H$, hydrogen or an acylated amino group and $R_5$ represents hydrogen, $NO_2$ or $NH_2$, no more than two nitro or two amino groups being present in the molecule at one time.

The above description sets forth the broad scope of our invention. The following examples are merely illustrative of our broad invention and in no way limit the same. The parts are given by weight.

Example 1

10 parts of 5-thiol-salicylic acid, 11.9 parts of 2:4-dinitro-chlorobenzene, and 5.8 parts of potassium acetate are boiled up in 75 parts of alcohol. The solution can be heated for several hours and, after cooling, the dinitrosulphide may be salted out with sodium chloride. It is filtered off and purified by dissolving in sodium carbonate solution and precipitating it with acid. The yield is almost quantitative. The dinitrosulphide formed has the probable formula

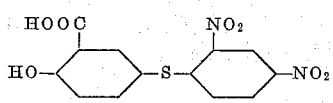

The 5-thiol-salicylic acid may be prepared as described by Stewart, or any convenient reducing agent may be used for reducing 5:5'-dithio-salicylic acid. For instance, we find sodium hydrosulphite very effective.

Example 2

10 parts of 5-thiol-salicylic acid are mixed with 15.85 parts of the sodium salt of 4-chloro-3-nitrobenzene sodium sulphonate and added to a boiling solution of 12 parts of anhydrous sodium acetate in water. The whole is boiled under a reflux condenser for some hours, cooled and acidified while being stirred. The precipitated nitro-sulphide is then filtered off, washed and dried. The nitro sulphide in the form of the free acid has the probable formula

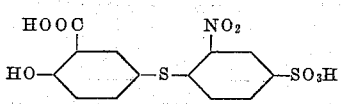

Instead of 4-chloro-3-nitrobenzene sulphonate of sodium, there may be used 4-chloro-3-nitrobenzoic acid, 2:6-dinitrochlorobenzene-4-sulphonic acid, etc. The probable structure of the product from 2:6-dinitro chlorobenzene-4-sulphonic acid is:

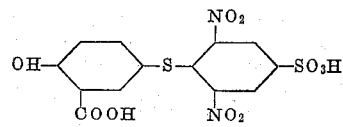

Example 3

10 parts of the amino sulphide obtained by reducing the nitro-sulphide of the preceding example (for instance, with iron and hydrochloric acid) are dissolved in water with 3 parts of sodium carbonate and 1.96 parts of sodium nitrite. The whole is allowed to flow down into well-cooled mineral acid, with stirring, when diazotization takes place. The diazo compound is then added to a solution of 4.1 parts of beta-naphthol dissolved in caustic soda in the presence of sodium carbonate. Coupling occurs rapidly and when complete the orange dyestuff is salted from solution, filtered off and dried. This monoazo dye has, in the form of the free acid, the probable formula

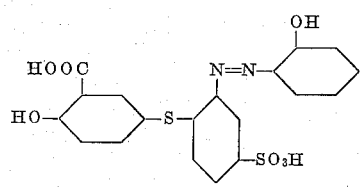

It dyes wool orange and becomes fast to milling and potting when chromed. Printed on cotton with a chrome mordant, it yields orange shades fast to warm soap and chlorine. Instead of beta-naphthol there may be mentioned as alternative second components acetyl H acid (bluish-red), 2':5'-dichlorophenyl-3-methyl-5-pyrazolone sulphonic acid (golden yellow), Gamma acid, acid coupling, (red), or Schaeffer acid (reddish-orange), and the like.

Example 4

23 parts of p-nitraniline-o-sulphonic acid (sodium salt) are dissolved in 500 parts of water and added to 35 parts of hydrochloric acid (36 per cent) diluted with 250 parts of water. After cooling to about 5° C. a solution of 6.9 parts of sodium nitrite in 40 parts of water is slowly added. When diazotization is complete the product is slowly run, while stirred, into a solution of 27.6 parts of the diamine obtained by reduction of the dinitro-sulphide derived from 5-thiol-salicylic acid and 2:4-dinitrochlorobenzene. The diamine is held in solution with 5.5 parts of soda ash and 50 parts of sodium bicarbonate are added to the solution.

When coupling is complete the dyestuff is salted out after making the solution neutral with hydrochloric acid. The precipitated dyestuff is filtered off, dried and ground.

The monoazo dye in the form of the free acid has the probable formula

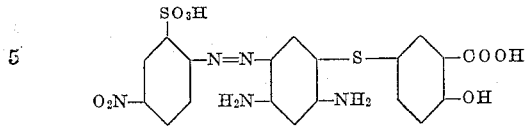

Cotton cloth is printed in red-violet shades when fixed with a chrome mordant. The shades are fast to warm soap.

Instead of p-nitraniline-o-sulphonic acid, there may be used as first components naphthionic acid (red brown) or 2:5-dichloroaniline (light red brown).

*Example 5*

A batch of dyestuff is prepared as in the preceding example. When coupling is complete the product is allowed to warm up to room temperature and is reduced in about 4 hours by a solution of 40 parts of crystallized sodium sulphide dissolved in 60 parts of water. The mixture is then made neutral by means of hydrochloric acid and a further 35 parts of hydrochloric acid (36 per cent) are then added. The whole is then cooled to about 5° C. or less and diazotized with 6.9 parts of sodium nitrite. When diazotization is complete 27.6 parts of the diaminosulphide is dissolved in 500 parts of water containing 36 parts of soda ash and added to the above. When coupling is complete the dyestuff is isolated by salting, filtering and drying. This disazo dyestuff in the form of the free acid has the probable formula

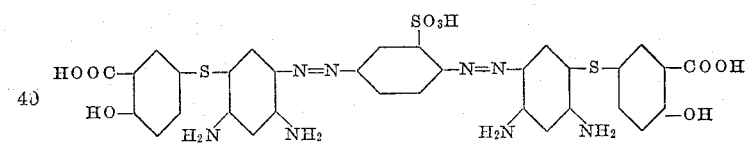

Cotton cloth is printed with a chrome mordant in violet shades fast to warm soap.

If acetyl H acid is used as the final component instead of the diamino-sulphide, the resulting dyestuff prints cotton with a chrome mordant in greenish-blue shades.

*Example 6*

38.8 parts of benzidine-m-disulphonic acid (sodium salt) are dissolved in 500 parts of water cooled to 10° C. and 13.8 parts of sodium nitrite added. The mixture is run into 70 parts of hydrochloric acid (36 per cent) diluted with 250 parts of water. During tetrazotization the mixture is kept at 10° C.

When tetrazotization is complete the product is added to a solution of 55.2 parts of the diamino-sulphide mentioned above—dissolved in 1000 parts of water containing 60 parts of soda ash. On completion of coupling, the dyestuff is salted out, filtered off and dried.

Cotton cloth is printed with a chrome mordant in yellowish-brown shades fast to warm soap.

We claim:—

1. As a new composition of matter, amino diphenyl sulphides having the probable formula

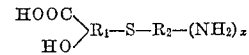

wherein $R_1$ and $R_2$ represent a benzene residue and $x$ represents 1 or 2, and in which the COOH and the OH are ortho to each other.

2. As a new composition of matter, amino diphenyl sulphides having the probable formula

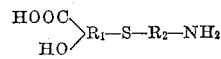

wherein $R_1$ and $R_2$ represent benzene residues and in which the OH and COOH are ortho to each other.

3. As a composition of matter, amino diphenyl sulphides having the probable formula

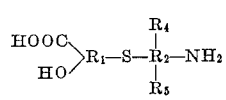

wherein $R_1$ and $R_2$ represent benzene residues, $R_4$ represents hydrogen, a sulphonic group, an amino group or acylated amino group and $R_5$ represents hydrogen or an amino group and in which the OH and COOH are ortho to each other.

4. As a new composition of matter, amino diphenyl sulphides having the probable formula wherein $R_4$ represents hydrogen, a sulphonic group or an amino group.

5. As a new composition of matter, 2-amino-4'-hydroxy-3'-carboxy-4-sulpho-diphenyl-sulphide, having the probable formula 6. In the manufacture of new dyestuff intermediates, the step which comprises condensing a 5-thiol-hydroxy-carboxy acid having the probable formula

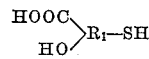

wherein $R_1$ represents a benzene residue and in which the COOH and OH groups are ortho to each other, with a nitro compound of the aromatic series containing a labile nuclear halogen atom.

7. In the manufacture of new dyestuff intermediates, the process which comprises condensing a 5-thiol-hydroxy-carboxy acid having the probable formula

wherein $R_1$ represents a benzene residue and in which the COOH and OH groups are ortho to each other, with a nitro compound of the benzene series containing a labile nuclear halogen atom and subsequently reducing the so produced nitro diphenyl sulphide to form the amino diphenyl sulphide.

8. In the manufacture of amino-diphenyl-sulphides, the step which consists in forming a nitro derivative of 4-hydroxy-diphenyl-sulphide-3-carboxylic acid, having the nitro groups attached to one phenyl residue and the hydroxy and carboxy groups attached to the other phenyl residue, by condensing a material, having as its acid basis 5-thiol-salicyclic acid, with a nitro compound of the benzene series containing a labile nuclear halogen atom.

9. In the manufacture of amino-diphenyl-sulphides by the process of claim 8, the step which comprises condensing a sodium salt of 5-thiol-salicylic acid with a nitro compound of the benzene series containing a labile nuclear halogen atom.

10. In the manufacture of amino-diphenyl-sulphides, the process which comprises preparing a nitro derivative of 4-hydroxy-diphenylsulphide-3-carboxylic acid by the process of claim 8, and reducing the nitro groups of said nitro derivative to amino groups.

11. In the manufacture of amino-diphenyl-sulphides, the process which comprises preparing a nitro derivative of 4-hydroxy-diphenylsulphide-3-carboxylic acid, having the nitro groups attached to one phenyl residue and the hydroxy and carboxy groups attached to the other phenyl residue, by condensing a sodium salt of 5-thiol-salicylic acid with a nitro compound of the benzene series containing a labile halogen atom, and reducing the nitro groups of said nitro derivative to amino groups.

12. Aminodiphenyl sulphides having the general formula

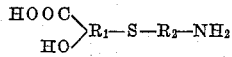

wherein $R_1$ and $R_2$ represent benzene residues and in which the COOH and the OH groups are ortho to each other, said products being readily soluble in alkaline solutions, much less soluble in water and dilute acids and giving, on diazotization, a yellow, sparingly soluble diazo compound.

13. Aminodiphenyl sulphides having the general formula

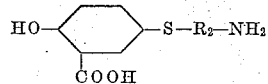

wherein $R_2$ represents a phenyl residue, said products being readily soluble in alkaline solutions, much less soluble in water and dilute acids and giving, on diazotization, a yellow, sparingly soluble diazo compound.

14. As a new composition of matter, the compound having the probable formula

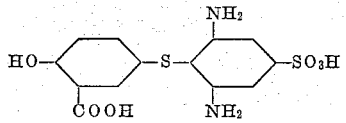

15. As new compositions of matter, the compounds represented by the following probable formula

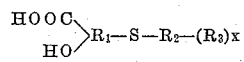

wherein $R_1$ and $R_2$ represent benzene residues and in which the OH and the COOH are ortho to each other, $R_3$ represents $NH_2$ or $NO_2$ and $x$ represents 1 or 2.

16. As new compositions of matter, the compounds represented by the following probable formula

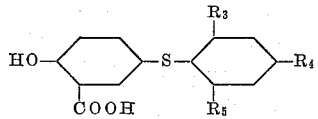

wherein $R_3$ represents a nitro or an amino group, $R_4$ represents hydrogen, a carboxyl group, a sulphonic group, an animo group, a nitro group or an acylated amino group and $R_5$ represents hydrogen, a nitro group or an amino group, not more than two nitro or two amino groups being present in the molecule at one time.

17. As new compositions of matter, nitro-phenyl sulphides having the general formula

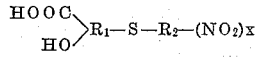

wherein $R_1$ and $R_2$ are benzene residues and in which the COOH and OH groups are ortho to each other, and $x$ represents 1 or 2.

18. As new compositions of matter, nitro-diphenyl sulphides having the general formula

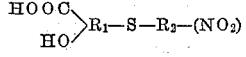

wherein $R_1$ and $R_2$ are benzene residues and in which the COOH and OH groups are ortho to each other.

19. As new compositions of matter, nitrodiphenyl sulphides having the probable formula
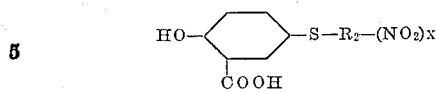
wherein $R_2$ represents a phenyl residue and $x$ represents 1 or 2.
20. As a new composition of matter, the compound having the probable formula
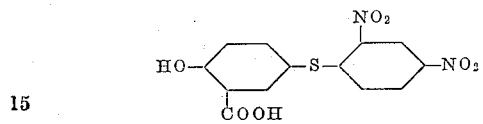
In testimony whereof we have hereunto affixed our signatures.
KENNETH HERBERT SAUNDERS.
MORDECAI MENDOZA.